US011895195B2

(12) United States Patent
Pierrepont (10) Patent No.: US 11,895,195 B2
(45) Date of Patent: Feb. 6, 2024

(54) SESSION BORDER CONTROLLER WITH DYNAMIC REPORTING

(71) Applicant: MICROSOFT TECHNOLOGY LICENSING, LLC, Redmond, WA (US)

(72) Inventor: Timothy James Pierrepont, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/699,007

(22) Filed: Mar. 18, 2022

(65) Prior Publication Data

US 2023/0300201 A1 Sep. 21, 2023

(30) Foreign Application Priority Data

Jan. 27, 2022 (GB) ...................................... 2201065

(51) Int. Cl.
*H04L 67/141* (2022.01)
*H04L 43/0829* (2022.01)
(Continued)

(52) U.S. Cl.
CPC ........ *H04L 67/141* (2013.01); *H04L 43/0817* (2013.01); *H04L 43/0829* (2013.01); *H04L 67/146* (2013.01)

(58) Field of Classification Search
CPC ............. H04L 43/0817; H04L 43/0829; H04L 67/141; H04L 67/146
(Continued)

(56) References Cited

U.S. PATENT DOCUMENTS 5,737,399 A 4/1998 Witzman et al.
2006/0031446 A1* 2/2006 Hamedi .............. H04L 41/0213
709/223
(Continued)

FOREIGN PATENT DOCUMENTS

EP 2876859 A1 5/2015

OTHER PUBLICATIONS

Byrne, John, "Metaswitch Perimeta: Product Assessment Report—Session Border Controller", Retrieved From: https://info.metaswitch.com/hubfs/pdfs/GlobalDataTech_Metaswitch-Perimeta.pdf, Jun. 8, 2021, pp. 1-18.

(Continued)

*Primary Examiner* — Meng Vang
(74) *Attorney, Agent, or Firm* — Newport IP, LLC; Han K. Gim (57) ABSTRACT

In various examples there is a session border controller, SBC, connected between two communications networks. The SBC comprises a store holding statistics of events in the networks. The SBC also has an ingress receiving messages from the first communications network, the ingress having a memory storing an ingress message manipulation function MMF comprising a plurality of rules. The SBC has a session border controller processing unit connected to the ingress and receiving the messages from the ingress. The SBC has an egress connected to the session border controller processing unit, the egress receiving the messages from the session border controller processing unit and forwarding the messages, to the second communications network, the egress having a memory storing an egress message manipulation function MMF comprising a plurality of rules. At least some of the rules of the ingress MMF or egress MMF are for computing and storing the statistics.

20 Claims, 4 Drawing Sheets

(51) Int. Cl.
*H04L 43/0817* (2022.01)
*H04L 67/146* (2022.01)

(58) Field of Classification Search
USPC .......................................................... 709/203
See application file for complete search history.

(56) References Cited

U.S. PATENT DOCUMENTS

| | | | |
|---|---|---|---|
| 2014/0032773 A1* | 1/2014 | Peter | H04L 65/1104 709/228 |
| 2015/0149559 A1* | 5/2015 | Phillips | H04L 65/1036 709/206 |
| 2016/0330111 A1* | 11/2016 | Manghirmalani | H04L 69/22 |
| 2017/0085459 A1* | 3/2017 | Xia | H04L 43/12 |
| 2019/0042293 A1 | 2/2019 | Cornett et al. | |
| 2019/0097889 A1* | 3/2019 | Browne | H04L 41/0895 |
| 2020/0218984 A1* | 7/2020 | Thornton | G06N 3/088 |
| 2021/0058749 A1 | 2/2021 | Al-damluji | |
| 2022/0329634 A1 | 10/2022 | Al-damluji | |

OTHER PUBLICATIONS

"Metaswitch Perimeta Statistics with Exception Reporting by Cordell", Retrieved From: https://www.metaswitch.com/about/press-releases/metaswitch-perimeta-statistics-with-exception-reporting-by-cordell, Oct. 1, 2012, 4 Pages.

"International Search Report and Written Opinion issued in PCT Application No. PCT/US2022/052490", dated Apr. 5, 2023, 18 Pages.

* cited by examiner

SESSION BORDER CONTROLLER WITH DYNAMIC REPORTING

CROSS-REFERENCE TO RELATED APPLICATION(S)

This non-provisional utility application claims priority to UK patent application number 2201065.6 entitled "SESSION BORDER CONTROLLER WITH DYNAMIC REPORTING" and filed on 27 Jan. 2022 which is incorporated herein in its entirety by reference.

BACKGROUND

Session border controllers (SBCs) are network elements at a point of demarcation between different parts of a communications network, such as a firewall between an intranet of an enterprise and the public Internet, or a filtering router between regions of a communications network having different security provisions. SBCs are typically used to protect Session Initiation Protocol (SIP) based Voice over Internet Protocol (VoIP) networks.

The embodiments described below are not limited to implementations which solve any or all of the disadvantages of known SBCs.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a session border controller, SBC, connected between a first communications network and a second communications network. The SBC comprises a store holding statistics of events in the communications networks. The SBC also has an ingress receiving messages from the first communications network, the ingress having a memory storing an ingress message manipulation function MMF comprising a plurality of rules. The SBC has a session border controller processing unit connected to the ingress and receiving the messages from the ingress. The SBC has an egress connected to the session border controller processing unit, the egress receiving the messages from the session border controller processing unit and forwarding the messages, to the second communications network, the egress having a memory storing an egress message manipulation function MMF comprising a plurality of rules. At least some of the rules of the ingress MMF or egress MMF are for computing and storing the statistics.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

SBCs are network elements at a point of demarcation between different parts of a communications network, such as a firewall between an intranet of an enterprise and the public Internet, or a filtering router between regions of a communications network having different security provisions. Sessions between parties in the different regions of the communications network traverse the SBC and the SBC is able to influence packets in those sessions for various purposes such as security, connectivity, quality of service, emergency call prioritization, media services and more. An SBC is typically inserted into a media or signaling path between endpoints in a VoIP call. The inventors have recognized that extending the functionality of an SBC is beneficial as described in more detail below.

Service providers providing services to end users over the communications networks often need measurement data such as statistics describing events in the communications networks. Service providers typically want more statistics than a conventional SBC has. In addition, the statistics needed by a particular service provider are typically very specific to their network and not readily reusable by other service providers. This creates a scaling problem. It is difficult for a generic SBC to provide statistics for everything service providers require, because there are many service providers with different requirements.

For example, one service provider might want a statistic of all calls from a Polycomm 605, while another wants a statistic counting all 503 responses with a Reason: header with value "go-away", while another wants a statistic which counts all calls with Resource-Priority: 0 and a P-Asserted-Identity: which differs from the From: header, while another wants a statistic which counts all calls asking for both SIP Outbound and Privacy features. All of these are very specific requests which are unlikely to be useful to other service providers. As such it is unlikely that an SBC will have code installed during manufacture which enables the particular statistics the service provider requires.

One option to meet the need for service provider specific statistics is to manually write product code to natively track the specified events and compute the bespoke statistics required. The code has to be installed in the SBC processing unit (described later in this document) by performing an upgrade. Doing so is time consuming and error prone. It also requires significant investment of resource from a development team, which needs to be balanced against other pressure on that resource.

The inventor has recognized a long-standing problem that service providers typically want more or different statistics than are available from an SBC. The inventor has recognized that this problem is solved by extending message manipulation function (MMF) so as to enable dynamic reporting of network behavior. MMF is used to manipulate protocol messages as described in more detail below. The inventor has recognized that it is possible to use MMF for a different purpose even though that goes against well-established use of MMF.

Message manipulation function MMF is a programming language that is used to carry out detailed manipulation of protocol messages. For example, an MMF component can be configured on a SIP network device to add, remove, or alter a SIP request line, header, or SIP message body. A programmer is able to create code using MMF and deploy that on an SBC in order to solve unanticipated problems quickly.

Standard MMF syntax gives operators access to variables, which they can then use both to test conditions, to set message values, and other similar purposes. For example, in an SIP MMF syntax, an example rule is:
IF (msg.request_uri.value CONTAINS '2345'):
    SET msg.p_asserted_id.value=msg.from.value This rule sets the value of the SIP P-Asserted-Identity header to be whatever the value of the "SIP From header" currently is, if the Request Uniform Resource identifier (URI) is "12345". This uses the values of particular SIP headers as variables, both for purposes of testing a condition, and setting a value.

Variables are drawn from one or more of the following sources: the contents of the message (e.g. the value of a particular header); networking properties of the message (e.g. the IP address to which the message is being sent); logical inferences from the above (e.g. msg.is_behind_nat might be False if the Via header matches the networking IP address, and True otherwise); and/or user-created variables derived from the above (whether stored for the lifetime of a message, a dialog, or a transaction).

MMF is a general-purpose SIP editor, built into a SIP back to back user agent such as an SBC. Service providers can then configure MMF rules to manipulate specific incoming and outgoing SIP messages in arbitrary ways. This is very useful because every service provider network has a different mix of endpoints, servers, policies and quirks which places different requirements on the SIP it sends and expects. As such SIP from external sources often needs editing before it is acceptable. Since SBCs sit at the edge of networks, most full featured SBCs implement MMF.

MMF allows individual properties of messages to be edited under user defined conditions, in user defined ways. For example, a particular service provider might have written their own server which has known limitations about how it expects incoming messages to look. SBCs are unlikely to have a built-in mode to support this, since this a requirement which is very specific to this service provider network. Nonetheless, MMF can often be used to reshape the messages appropriately before they are sent to the server. Similarly, there is a vast array of SIP endpoints in the world, and many of them have unusual, proprietary or unexpected behaviors. MMF can be used to reshape their messages so they are compatible with more standards-compliant devices, and function correctly when interoperating with the service provider network.

To accomplish this MMF comprises a plurality of rules each having: an action to take, and a condition to take that action in. For example, a service provider who found that manufacturer A endpoints were sometimes failing to ask for the correct privacy options might configure a rule like "add a Privacy: header" with the condition "to messages from endpoints with a User-Agent: Manufacturer A header which does not already contain one". For it to be useful, MMF typically implements a powerful condition descriptions schema, to ensure the user is able to specify the exact messages and circumstances under which they want their edits made. MMF would be useless if it applied to everything, typically service providers want to be very precise in which messages get edited. An example MMF lets service providers make edits conditional on any property of the message to be edited, on the addresses and transports in use, on information stored from previous messages in the dialog, on custom user data, and on many other things. Other MMF typically has similarly powerful conditional logic.

The embodiments described herein extend MMF with a new kind of action. Instead of editing the message, this action increments a statistic of a given name. This could either be a global statistic, or one at a more specific scope. The same power that allows service providers to be very specific in what conditions to edit a message in also allows service providers to be very specific about what they want to count. With this functionality there is no longer a need to specifically write product code for every statistic a service provider (service provider) requires (or else reject the request to do so). Instead, statistics can be implemented on live systems, either as part of initial commissioning, or as and when the need for them is discovered. This can aid not just in monitoring the network, but also in debugging, since service provider support teams can define new statistics to verify or rule out that a specific kind of message is being received.

These statistics are then displayed in a format common with other statistics on the SBC, either through a command line interface (CLI), or a monitoring technology such as simple network management protocol (SNMP).

Figure 1:
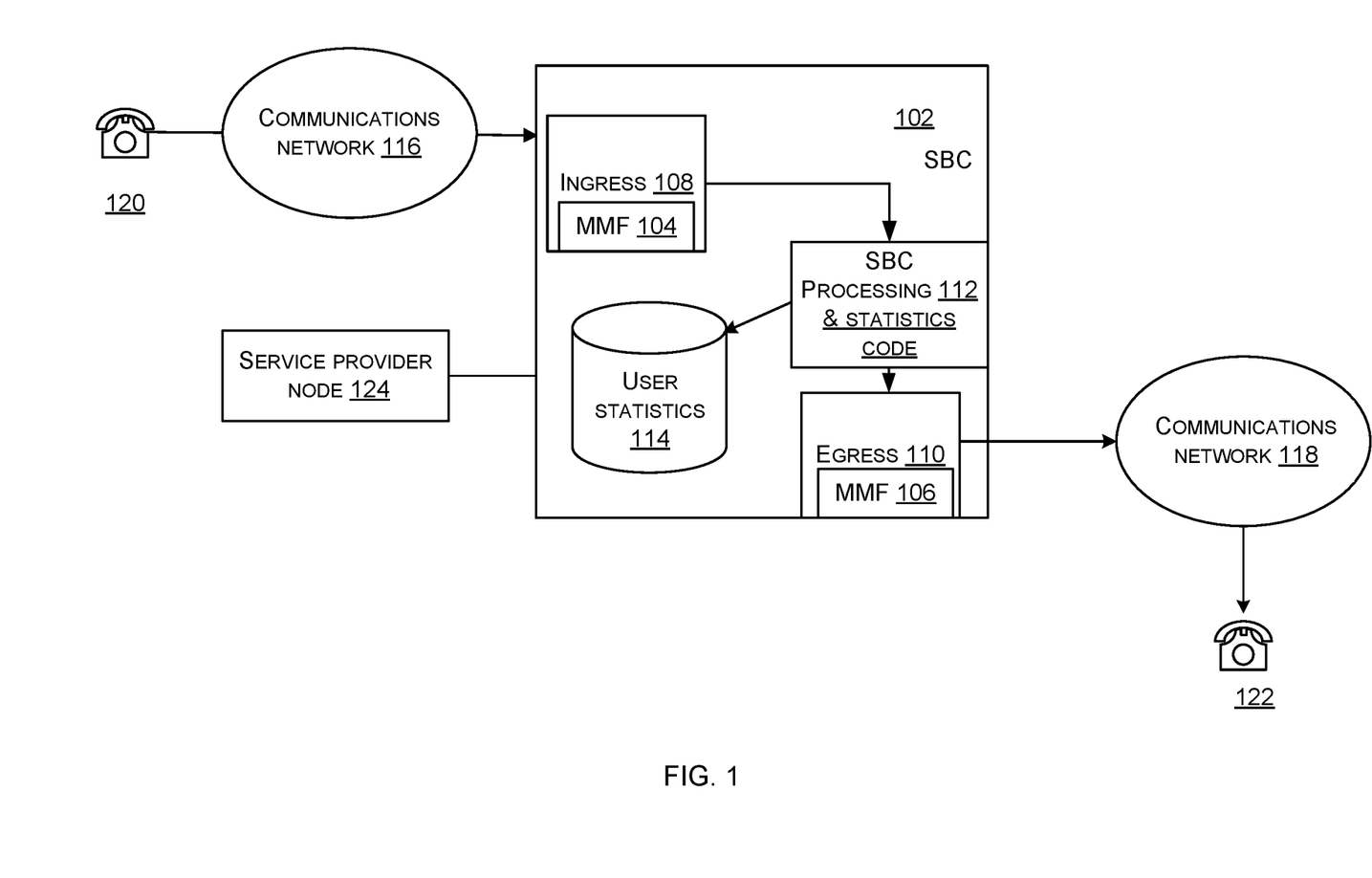
FIG. 1 is a schematic diagram of a session border controller connected between two communications networks.

FIG. 1 is a schematic diagram of a session border controller, SBC, 102 connected between a first communications network 116 and a second communications network 118, the SBC 102 comprising: a store 114 holding statistics of events in the communications networks; an ingress 108 receiving messages from the first communications network 116, the ingress having a memory storing an ingress message manipulation function MMF 104 comprising a plurality of rules. The SBC 102 has a session border controller processing unit 112 connected to the ingress 108 and receiving the messages from the ingress 108. The SBC 102 has an egress 110 connected to the session border controller processing unit 112, the egress 110 receiving the messages from the session border controller processing unit 112 and forwarding the messages, to the second communications network 118, the egress 110 having a memory storing an egress message manipulation function MMF 106 comprising a plurality of rules. At least some of the rules of the ingress MMF 104 or egress MMF 106 are for computing and storing the statistics in store 114.

The messages received from the first communications network 116 are from an endpoint 120 which has a communication session established with another endpoint 122 in the second communications network 118 in some examples. The MMF 104 is used to manipulate the messages before they are processed by the SBC processing unit 112. The Egress MMF 106 is then able to manipulate the messages further before they are forwarded to endpoint 122 in the second communications network 118.

The statistics describe events in one or both of the communications networks 116, 118. A non-exhaustive list of examples of types of statistics is: counters and gauges. Counters keep count of how many times a particular event has happened, such as a call of a certain type being received. In an example, counters only go up. Gauges keep track of how many of a given thing are happening right now, for example, emergency calls. Gauges go up when these start and down when these end. A non-exhaustive list of examples of statistics is: count of calls with an X-MyTelCo: header, counts of calls which offer codec PCMU but not codec PCMA, count of calls marked as emergency with a Priority: header but which are not directed to 911, count of calls which are being redirected to a number outside the U.S., count of calls which are asking for both SIP Outbound and Preconditions and which do not come from a specified IP, count of calls with embedded location information directed towards a specific server.

A service provider node 124 is connected to the SBC and is able to edit, delete or add rules to the MMF 104 or the MMF 106 in order to change how the messages are manipulated.

If a service provider requires a particular statistic to be computed by the SBC 102 which is not currently available, the SBC is upgraded and new code added to the SBC processing until 112. The new code computes the required statistic and stores the computed values in store 114. As explained above this approach is complex, difficult to scale and also means that the new code must be written and the SBC upgraded to add it. This approach typically requires significant service provider engineering resource to schedule and perform, usually in quiet hours such as during the night.

Figure 2:
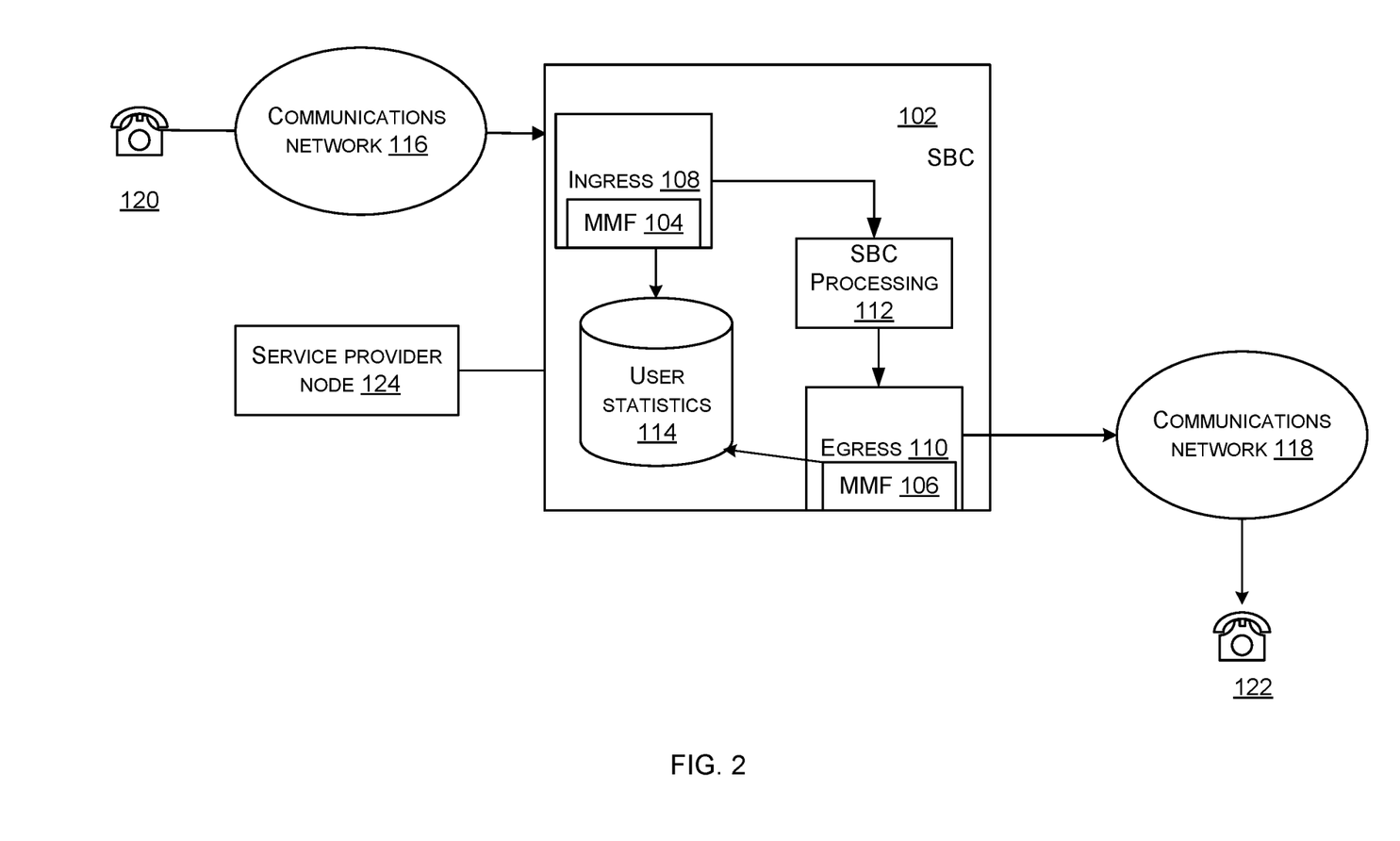
FIG. 2 is a schematic diagram of another session border controller connected between two communications networks.

FIG. 2 shows another SBC 102 where the MMF 104 and/or MMF 106 compute values of the statistics and store those in the store 114. In this way the SBC processing unit 112 does not have to be upgraded and does not compute the statistics as in FIG. 1. In the example of FIG. 2 the service provider node 124 is able to access the MMF 104 and/or MMF 106 to deploy new rules for computing statistics whilst the SBC 102 is online Thus, one or more of the rules for computing statistics are received at the SBC 102 from a service provider node 124 and implemented at the SBC 102 during live operation of the SBC. This is particularly beneficial since statistics are computed on the fly and there is no need to upgrade the SBC processing unit 112. The rules for computing statistics comprise a condition specifying details of an event in the communications networks 116, 118 and also comprise an action for incrementing a statistic of a given name Once the rules are deployed the MMF 104 or MMF 106 checks whether any of the conditions are met given a particular message which has been received. If the conditions are met, then the MMF 104 or MMF 106 carries out the action of the rule whose condition was met. The action is to compute a statistic such as incrementing a count or decrementing a gauge.

In some examples, the rules for computing statistics generate debugging data. This is very useful since, in the light of a new error or malfunction of the SBC 102, it is possible to compute bespoke statistics to assist with identifying a cause of the error.

In an example, one or more of the rules for computing statistics comprise a condition and also comprise an action for incrementing a statistic of a global scope. By using conditions and actions an effective, efficient way to trigger computation of statistics describing events is given since the actions are only computed when the appropriate conditions are met. By using a statistic of a global scope, it is possible to obtain data about events globally in the communications networks.

In some cases, at least some of the rules of the ingress MMF and at least some of the rules of the egress MMF are for computing and storing the statistics. By using both the ingress MMF and the egress MMF to compute statistics the variety of types of events to compute statistics about is increased.

In some examples the session border controller processing unit comprises a command line interface for displaying the statistics. In this way an operator is able to use the CLI to view values of the statistics from the store 114 which is a secure and effective way to access the statistics.

In some examples the session border controller processing unit uses simple network management protocol, SNMP, to expose the statistics. Thus the SBC has an SNMP interface which is accessible programmatically whereby third-party tools can be set up to retrieve values of the statistics over the SNMP interface and then parse and display the retrieved values. In some examples, the SBC is configured to automatically output the values of the statistics to a file at specified intervals of time. The files provide a record of historical statistical data from the SBC. In some examples, the files are sent to the service provider node 124 or any other specified location. By outputting the statistics in a file a simple, secure and convenient way of transferring the statistics to another entity in the communications networks 116, 118 is given.

In various examples, others of the rules of the ingress MMF or egress MMF are for modifying messages as described above. In this way the SBC is able to operate effectively as a border between two communications networks 116, 118.

In some examples at least some of the rules of the ingress MMF or egress MMF are for modifying messages and for computing and storing the statistics. By using a rule which both modifies messages and computes statistics it is possible to reduce a total number of rules at the MMF 104 or MMF 106. By reducing the number of rules in this way efficiencies are gained since there are fewer rule conditions to check when a new message arrives.

In some cases, the SBC processing unit is configured to monitor at least one of the statistics with respect to a threshold and to take an action when the value of the statistic reaches the threshold. This gives an accurate way to automatically control the SBC 102. In an example the action is any of: triggering an alert, dropping a packet. For example, if a statistic reaches a threshold which indicates a service level agreement is about to be exceeded, then an alert is triggered or subsequent packets (messages) are dropped by the SBC 102 rather than being forwarded to the second communications network 118.

The SBC of the disclosure operates in an unconventional manner to achieve computation of statistics.

Alternatively, or in addition, the functionality of the SBC is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 3:
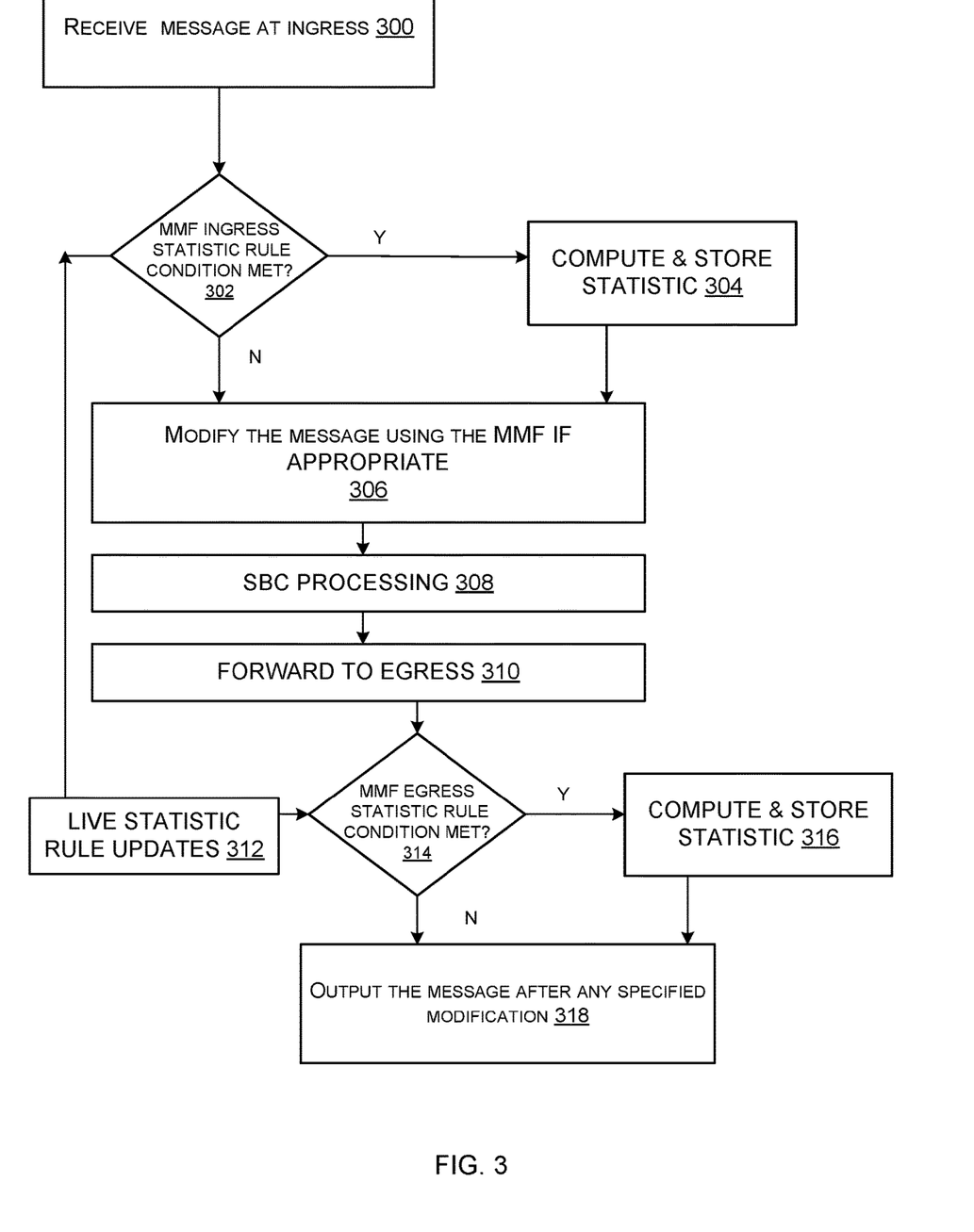
FIG. 3 is a flow diagram of a method of operation at a session border controller such as that of FIG. 2.

FIG. 3 is a flow diagram of a method performed at the SBC of FIG. 2. The method comprises receiving 300, at an ingress, messages from the first communications network. In an example the messages are SIP messages from an endpoint 120 and intended to be sent to endpoint 122 as part of a communication session between the endpoints 120, 122.

The method comprises using a memory at the ingress to store an ingress message manipulation function MMF comprising a plurality of rules. The ingress MMF checks 302 whether a statistic rule condition is met. If so, the ingress MMF computes 304 and stores the statistic by executing the rule action; and then the process moves to operation 306.

At operation 306, which is also reached if the statistic rule condition is not met at check 302, the ingress MMF modifies the message using the other MMF rules in the ingress MMF if appropriate. The ingress MMF forwards the message to the SBC processing unit which carries out SBC processing 308. The SBC processing is any conventional SBC processing such as filtering out malformed messages, blocking misbehaving endpoints, rewriting SIP headers and SIP bodies, and policing configured call limits The SBC processing unit forwards 310 the message to the egress. The egress MMF checks if a statistic rule condition is met at check 314. If so, the egress MMF computes and stores a statistic 316 by executing the action of the rule which has a met condition. The process then moves to operation 318.

If no statistic rule condition is met at operation 314 the egress MMF modifies the message if specified by any of the other MMF rules. The egress MMF then outputs the message 318.

As indicated in FIG. 3 live statistic rule updates 312 are received at the ingress MMF and/or the egress MMF from a service provider node in the communications network. The live statistic rule updates 312 are received as the SBC is in operation and are incorporated into the respective MMFs and used at checks 302 and 314 of the method of FIG. 3. In this way dynamic updates to the statistics which are computed are possible in an efficient and effective manner In an example there is a system comprising a processor and memory storing computer executable instructions that, when executed by the processor, cause the system to perform operations comprising:
receiving a message from a communications network;
accessing a message manipulation function (MMF) comprising a plurality of rules having a condition and an action, the MMF extended to enable runtime reporting of network behavior;
accessing one of the plurality of rules that specify an event in the communications network;
determining that a condition associated with the accessed rule is met based on the received message; and
executing an action associated with the accessed rule based on the condition being met, wherein the action is to compute or store a statistic associated with network behavior of the communications network.

Figure 4:
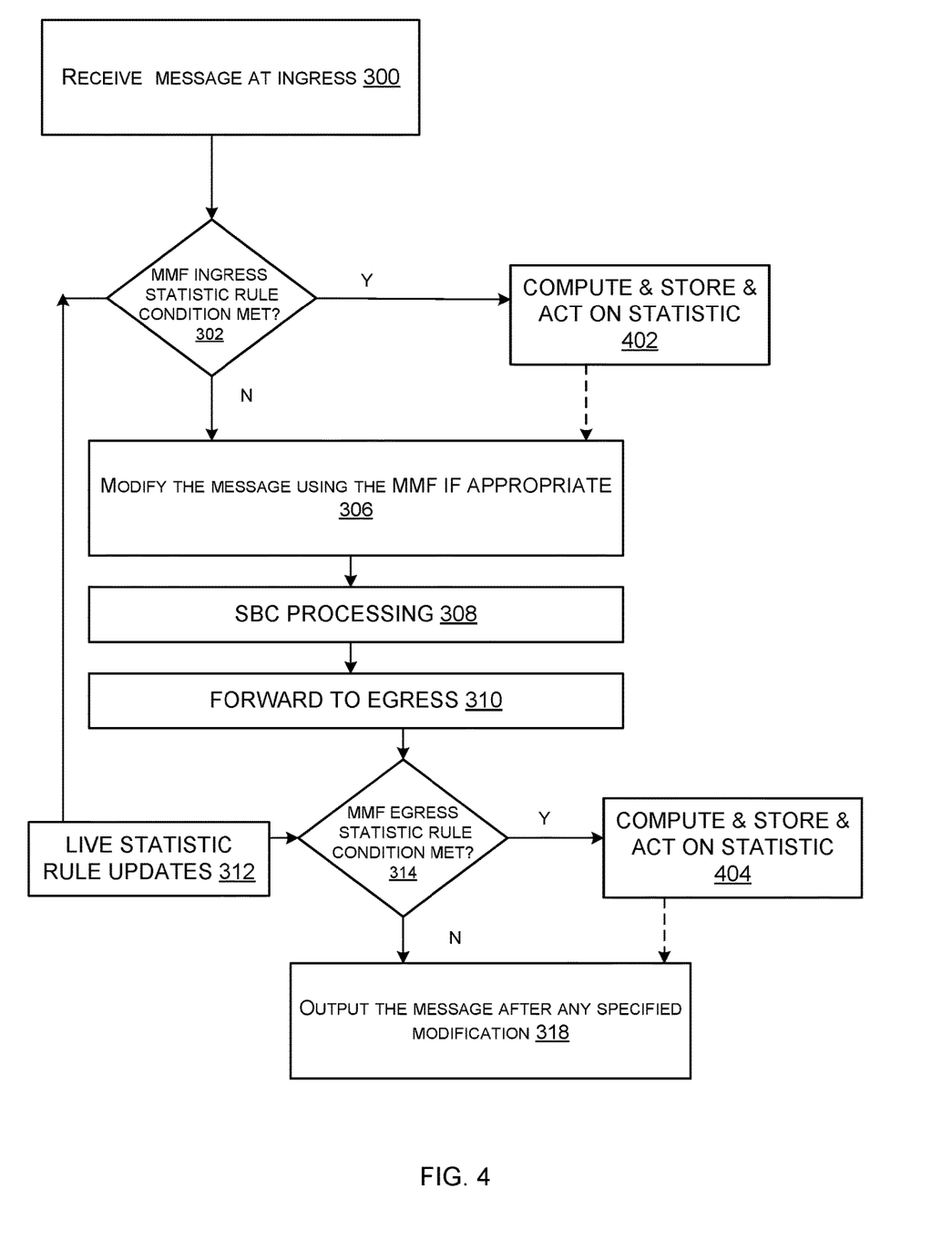
FIG. 4 is a flow diagram of another method of operation at a session border controller such as that of FIG. 2.

FIG. 4 is a flow diagram of another method performed at the SBC of FIG. 2. The method of FIG. 4 is the same as for FIG. 3 except that the ingress MMF is arranged so that when it finds a statistic rule condition is met, computes stores and acts on the statistic at operation 402. The ingress MMF computes the statistic and compares the statistic to a threshold in some cases. If the threshold is met or exceeded the ingress MMF triggers an alert or drops the message or takes another action. In this way there is automatic control of the SBC to drop messages where a service level agreement is exceeded or about to be exceeded. There is automatic control of the SBC to trigger an alert in the event of a statistic indicating malicious behavior or a security breach. Thus, there is improved control of the SBC which gives efficiency and/or improved security.

The egress MMF is optionally also arranged so that when it finds a statistic rule condition is met, it computes stores and acts on the statistic at operation 404.

The SBC of FIG. 2 comprises one or more processors such as in the ingress 108, SBC processing unit 112, egress 110 which are microprocessors, controllers or any other suitable type of processors for processing computer executable instructions to control the operation of the device in order to process communications messages. In some examples, for example where a system on a chip architecture is used, the processors include one or more fixed function blocks (also referred to as accelerators) which implement a part of the method of FIG. 3 and FIG. 4 in hardware (rather than software or firmware). Platform software comprising an operating system or any other suitable platform software is provided at the SBC to enable application software to be executed on the device where appropriate.

The computer executable instructions are provided using any computer-readable media that is accessible by the SBC. Computer-readable media includes, for example, computer storage media such as memory within the SBC 102 and communications media. Computer storage media, such as memory, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. In some examples, the memory, including store 114 is distributed or located remotely and accessed via a network or other communication link.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A session border controller (SBC) communicatively coupled to a first communications network and a second communications network, the SBC comprising:
   a storage configured to store data indicative of statistics for events that are specific to the first and second communications networks;
   an ingress configured to receive messages from the first communications network, the ingress having a memory storing an ingress message manipulation function (MMF) comprising a plurality of rules;
   a SBC processing unit connected to the ingress and configured to receive the messages from the ingress; and
   an egress connected to the SBC processing unit, the egress configured to receive the messages from the SBC processing unit and forward the messages to the second communications network, the egress having a memory storing an egress MMF comprising a plurality of rules;
   wherein at least some of the rules of the ingress MMF or egress MMF are for accumulating, computing and storing the statistics, wherein the plurality of rules are modifiable to change the statistics that are accumulated and computed and modifiable while the SBC is in operation between the first communications network and the second communications network.

2. The SBC of claim 1, wherein one or more of the rules for computing statistics are received at the SBC from a service provider node and implemented at the SBC during live operation of the SBC.

3. The SBC of claim 1, wherein the rules for computing statistics comprise a condition specifying details of an event in the communications networks and also comprise an action for incrementing a statistic of a given name.

4. The SBC of claim 1, wherein the rules for computing statistics are operable to generate debugging data.

5. The SBC of claim 1, wherein one or more of the rules for computing statistics comprise a condition and an action for incrementing a statistic having a global scope.

6. The SBC of claim 1, wherein at least some of the rules of the ingress MMF and at least some of the rules of the egress MMF are operable for computing and storing the statistics.

7. The SBC of claim 1, wherein the SBC processing unit comprises a command line interface for displaying the statistics.

8. The SBC of claim 1, wherein the SBC processing unit uses simple network management protocol (SNMP) to make the statistics available to other tools.

9. The SBC of claim 1, wherein others of the rules of the ingress MMF or egress MMF are operable for modifying messages.

10. The SBC of claim 1, wherein at least some of the rules of the ingress MMF or egress MMF are for operable modifying messages and for computing and storing the statistics.

11. The SBC of claim 1, wherein the SBC processing unit is configured to monitor at least one of the statistics with respect to a threshold and to take an action when a value of the statistic reaches the threshold.

12. The SBC of claim 11, wherein the action is any of: triggering an alert or dropping a packet.

13. A method performed by a session border controller (SBC) connected between a first communications network and a second communications network, the method comprising:
   receiving, at an ingress of the SBC, a first message from the first communications network;
   receiving, by a SBC processing unit connected to the ingress, the message from the ingress;
   based on the message and an ingress message manipulation function (MMF) stored at a memory of the ingress, the ingress MMF comprising a first plurality of rules, accumulating and computing first statistics of events that are specific to the first communications network and wherein the first plurality of rules are modifiable to change the first statistics that are accumulated and computed while the SBC is in operation between the first communications network and a second communications network;

receiving, by an egress connected to the SBC processing unit, the message from the SBC processing unit;

forwarding, by the egress, the message to the second communications network; and based on the message and an egress MMF stored at a memory of the egress, the egress MMF comprising a second plurality of rules, accumulating and computing second statistics of events that are specific to the second communications network and wherein the second plurality of rules are modifiable to change the second statistics that are accumulated and computed while the SBC is in operation between the first communications network and a second communications network.

14. The method of claim 13, wherein one or more of the first or second plurality of rules are received at the SBC from a service provider node and implemented at the SBC during live operation of the SBC.

15. The method of claim 13, wherein the first or second plurality of rules comprise a condition specifying details of an event in the first or second communications networks and comprise an action for incrementing a statistic of a given name.

16. The method of claim 13, wherein the first or second plurality of rules are operable to generate debugging data.

17. The method of claim 13, wherein one or more of the first or second plurality of rules comprise a condition and an action for incrementing a statistic of a global scope.

18. The method of claim 13, wherein at least some of the first plurality of rules of the ingress MMF and at least some of the second plurality of rules of the egress MMF are for computing and storing the statistics.

19. The method of claim 13, wherein the SBC processing unit is configured to monitor at least one of the statistics with respect to a threshold and take an action when a value of the statistic reaches the threshold.

20. A system comprising a processor and memory storing computer executable instructions that, when executed by the processor, cause the system to perform operations comprising:

receiving a first message from a first communications network;

based on the first message and an ingress message manipulation function (MMF) comprising a first plurality of rules, accumulating and computing first statistics of events that are specific to the first communications network and wherein the first plurality of rules are modifiable to change the first statistics that are accumulated and computed while the system is in operation between the first communications network and a second communications network;

forwarding the message to a second communications network; and based on the message and an egress MMF comprising a second plurality of rules, accumulating and computing second statistics of events that are specific to the second communications network and wherein the second plurality of rules are modifiable to change the second statistics that are accumulated and computed while the system is in operation between the first communications network and a second communications network.

* * * * *